United States Patent
Puri et al.

(10) Patent No.: US 11,983,488 B1
(45) Date of Patent: May 14, 2024

(54) SYSTEMS AND METHODS FOR LANGUAGE MODEL-BASED TEXT EDITING

(71) Applicant: OpenAI Opco, LLC, San Francisco, CA (US)

(72) Inventors: Raul Puri, San Francisco, CA (US); Qiming Yuan, San Francisco, CA (US); Alexander Paino, San Francisco, CA (US); Nikolas Tezak, San Francisco, CA (US); Nicholas Ryder, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 18/183,902

(22) Filed: Mar. 14, 2023

(51) Int. Cl.
*G06F 40/166* (2020.01)
*G06F 40/103* (2020.01)
*G06F 40/40* (2020.01)

(52) U.S. Cl.
CPC .......... *G06F 40/166* (2020.01); *G06F 40/103* (2020.01); *G06F 40/40* (2020.01)

(58) Field of Classification Search
CPC ...... G06F 40/166; G06F 40/103; G06F 40/40; G06F 3/167; G06F 16/90335; G10L 15/26; G10L 15/22; G06N 3/044
See application file for complete search history.

(56) References Cited

U.S. PATENT DOCUMENTS

| 6,253,177 | B1* | 6/2001 | Lewis | G10L 15/22 |
| | | | | 704/E15.04 |
| 10,276,170 | B2* | 4/2019 | Gruber | G06F 3/167 |
| 10,446,148 | B2* | 10/2019 | Papangelis | G10L 15/063 |
| 10,705,794 | B2* | 7/2020 | Gruber | G10L 15/22 |
| 11,516,158 | B1* | 11/2022 | Luzhnica | G06F 40/35 |
| 2020/0020319 | A1* | 1/2020 | Malhotra | G10L 15/26 |
| 2020/0342172 | A1* | 10/2020 | Cai | G06N 3/044 |
| 2021/0157553 | A1 | 5/2021 | Ligman et al. | |

(Continued)

FOREIGN PATENT DOCUMENTS

| CN | 103154936 A | * | 6/2013 | ... G06F 17/241 |
| CN | 114238629 A | * | 3/2022 | ... G06F 16/35 |
| WO | 2022015730 A1 | | 1/2022 | |

OTHER PUBLICATIONS

Jay Alammar, "The Illustrated GPT-2 (Visualizing Transformer Language Models)", Feb. 9, 2023, pp. 1-34.

(Continued)

*Primary Examiner* — Richemond Dorvil
*Assistant Examiner* — Nadira Sultana
(74) *Attorney, Agent, or Firm* — Finnegan, Henderson, Farabow, Garrett & Dunner LLP

(57) ABSTRACT

Disclosed herein are methods, systems, and computer-readable media for automatically generating and editing text. In an embodiment, a method may include receiving an input text prompt and receiving one or more user instructions. The method may also include accessing a language model based on the input text prompt and the one or more user instructions. The method may also include outputting, using the accessed language model, language model output text. The method may also include editing the input text prompt based on the language model and the one or more user instructions by replacing at least a portion of the input text prompt with the language model output text.

16 Claims, 11 Drawing Sheets

(56) References Cited

U.S. PATENT DOCUMENTS

| | | | |
|---|---|---|---|
| 2021/0295172 A1* | 9/2021 | Sultan | G06N 3/047 |
| 2021/0319188 A1* | 10/2021 | Zhou | G06F 40/40 |
| 2021/0342517 A1 | 11/2021 | Ittycheriah et al. | |
| 2022/0237368 A1 | 7/2022 | Tran | |
| 2022/0335203 A1 | 10/2022 | Van Dyke et al. | |
| 2022/0350574 A1* | 11/2022 | Alwell | G06F 40/40 |
| 2023/0134852 A1* | 5/2023 | Lee | G06F 16/3347 |
| | | | 707/771 |

OTHER PUBLICATIONS

European Patent Office, Int'l Search Report in Application No. PCT/US2023/075857 (Jan. 30, 2024), 12 pages.

* cited by examiner

SYSTEMS AND METHODS FOR LANGUAGE MODEL-BASED TEXT EDITING

FIELD OF DISCLOSURE

The disclosed embodiments generally relate to systems, devices, methods, and computer readable media for automatically generating, editing, and inserting text using a language model-based approach.

BACKGROUND

Large language models (LMs) can be prompted or instructed to perform a range of natural language processing (NLP) tasks, given some examples of the task as input. Many conventional LMs and related systems, however, lack the capabilities to accurately understand natural language input and rapidly implement text or code changes in response to such input. conventional LMs are often configured for very specific tasks as well, and lack the flexibility to respond to a broad range of natural language inputs. Moreover, many LMs are not well integrated with APIs or trained on well-tailored datasets, leading to poor predictive results and lack of integration with other systems. The disclosed embodiments address one or more of these shortcomings, as well as others that are readily apparent.

SUMMARY

Embodiments of the present disclosure present technological improvements as solutions to one or more of the above-mentioned technical problems recognized by the inventors in conventional systems. For example, in an embodiment, a non-transitory computer-readable medium may include instructions that are executable by one or more processors to perform operations for automatically generating and editing text. The operations may include receiving an input text prompt, receiving one or more user instructions, accessing a language model based on the input text prompt and the one or more user instructions, outputting, using the accessed language model, language model output text, and editing the input text prompt based on the language model and the one or more user instructions by replacing at least a portion of the input text prompt with the language model output text.

According to some disclosed embodiments, the input text prompt comprises text or computer code.

According to some disclosed embodiments, the input text prompt comprises an empty input set.

According to some disclosed embodiments, the one or more user instructions comprise user-specified natural language instructions and the operations further comprise determining one or more model parameters, based on the user-specified natural language instructions, that constrain the editing of the input text prompt.

According to some disclosed embodiments, the one or more model parameters comprise at least one of a tone, structure, or format associated with the input text prompt.

According to some disclosed embodiments, the language model is configured to determine at least one context parameter based on the input text prompt and editing the input text prompt is based on the language model and the at least context parameter.

According to some disclosed embodiments, the language model is configured to output the language model output text based on at least one of a sampling temperature parameter or a nucleus sampling parameter.

According to some disclosed embodiments, the language model is optimized through one or more iterative cycles of training based on one or more datasets.

According to some disclosed embodiments, the one or more datasets comprise at least one of user instruction data or user-labeled data based on one or more output text prompts.

According to some disclosed embodiment, a non-transitory computer-readable medium may include instructions that are executable by one or more processors to perform operations for automatically generating and inserting text. The operations may include receiving an input text prompt comprising a prefix portion and a suffix portion, accessing a language model based on the input text prompt, determining a set of context parameters based on the input text prompt and the language model, generating an output text prompt based on the set of context parameters and the language model, and inserting the output text prompt into the input text prompt.

According to some disclosed embodiments, the input text prompt comprises text or computer code.

According to some disclosed embodiments, the prefix portion or suffix portion comprises an empty input set.

According to some disclosed embodiments, the language model is configured to identify an insertion position for the output text prompt, wherein the insertion position is between the prefix portion and the suffix portion.

According to some disclosed embodiments, the set of context parameters comprise a tone, structure, or format associated with the input text prompt.

According to some disclosed embodiments, generating the output text prompt is based on the one or more context parameters associated with the input text prompt.

According to some disclosed embodiments, the language model is optimized through one or iterative cycles of training based on one or more datasets.

According to some disclosed embodiments, the one or more datasets comprise user-instruction data or user-labeled data based on one or more output text prompts.

According to some disclosed embodiments, the length of the output text prompt is constrained by a length parameter of the language model, the length parameter being influenced by a user input.

Other systems, methods, and computer-readable media are also discussed within.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
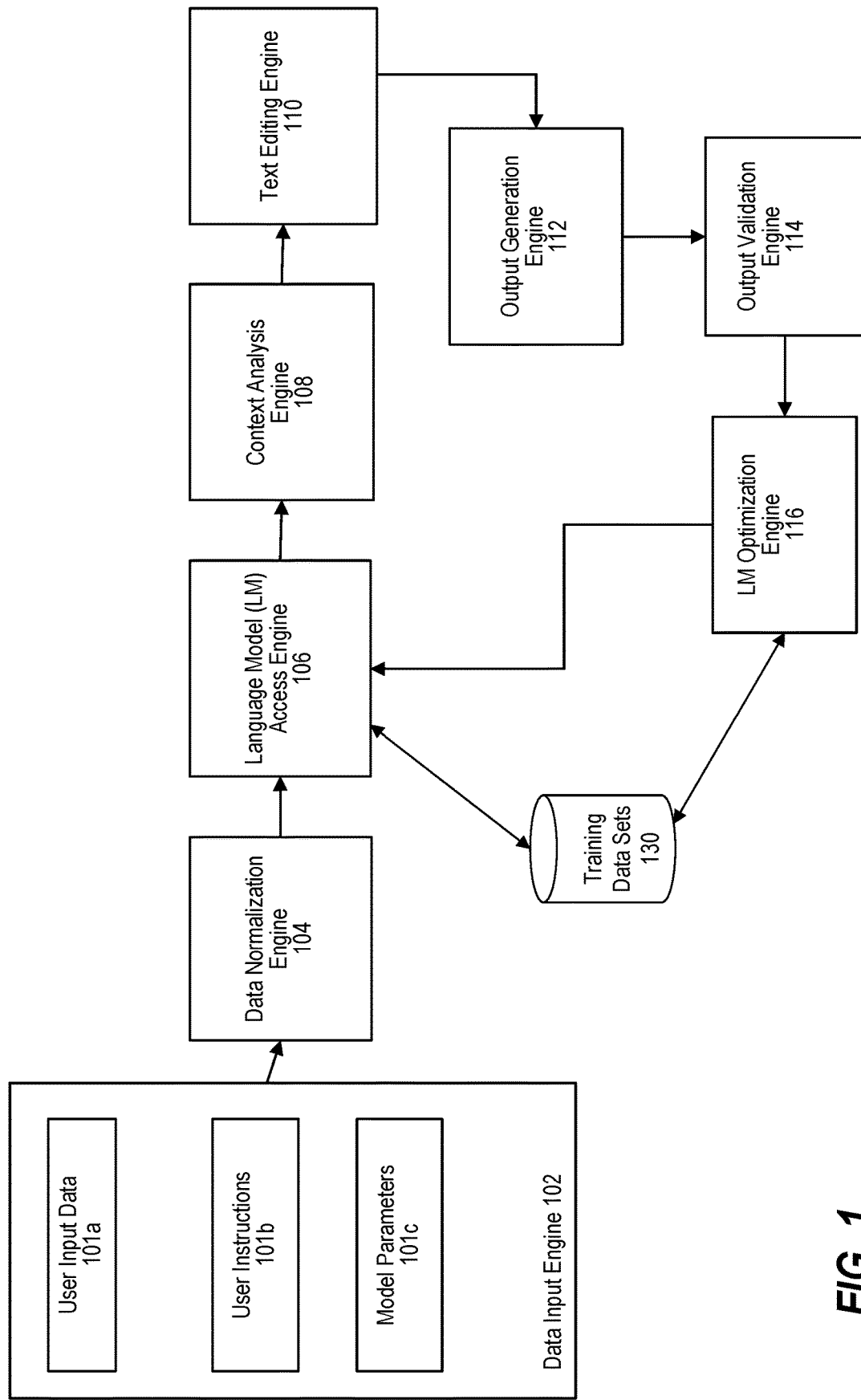
FIG. 1 is a block diagram illustrating an exemplary system for automatically generating and editing text.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

LMs of various capabilities, described herein, may be utilized to improve the versatility and robustness of Application Programming Interfaces (APIs) to perform a multitude of tasks involving understanding or generating natural language or code. For instance, the model may be used to edit text given a prompt and an instruction from the user, thus providing a natural interface for translating and tweaking text, as well as for refactoring and working with code. The model may also be used to insert text within text by providing a suffix prompt in addition to a prefix prompt, when writing long-form text, transitioning between paragraphs, following an outline, guiding the model towards an ending, or inserting code in the middle of a function or file. Illustrative embodiments of the present disclosure are described below. While some embodiments may be described with respect to "text" or "code," it should be noted that such embodiments may apply to both text and code (e.g., computer code), as well as any digital information comprising one or more characters.

FIG. 1 is a block diagram illustrating an exemplary system for automatically generating and editing text.

System 100 can include data input engine 102. Data input engine 102 may obtain data directly from external users. Data input engine 102 may obtain user input data 101*a*, comprising text data in the form of a sentence, a phrase, a paragraph, or any combination of characters. In some embodiments, user input data may comprise computer code. In some embodiments, user input data may comprise an input text prompt. Additionally or alternatively, user input data may comprise of a null set (e.g., having no user input or no natural language input). Data input engine 102 may obtain user instructions 101b, comprising text data in the form of at least one of a sentence, a paragraph, or a user prompt. A user instruction may include at least one of an instruction, a defined task, or any combination of parameters that set one or more constraints on language model output. For instance, user instruction may comprise "compose a poem about Chatbots", "make this into the voice of [a character]" (wherein the character is defined in the input data), or "format this like a letter and sign it [with the name of a character]." In some embodiments, user instructions may include user-specified natural language instructions. For instance, a user instruction may comprise "draft this in letter format using my name" or "make this in the voice of user 273." In some embodiments, user input data or user instruction may correspond to a particular language model application framework (e.g., which may include a digital text pattern, format, structure, or style). In some embodiments, an Application Programming Interface (API) may define the particular language model application framework. Data input engine 102 may also obtain a set of model parameters 101c. In some embodiments, model parameters may comprise one or more of a tone (e.g., stern, kind, funny), a structure (e.g., prose, free narrative), or format (e.g. poem, formal letter) associated with the input data. In some embodiments, model parameters may comprise properties associated with an author of the input text prompt (e.g., gender, point-of-view).

System 100 can further include data normalization engine 104. Data normalization engine 104 may perform tokenization of input data. Data normalization engine 104 may also perform lemmatization, stemming, and part-of-speech tagging of input data. In some embodiments, data normalization engine 104 may perform normalization based on the length of user input data as exemplified by 101a or the desired length of output based on a user instruction as exemplified by 101b. In some embodiments, data normalization engine 104 may perform normalization based on a set of model parameters as exemplified by 101c. In some embodiments, a language model application framework may correspond to at least one of generation, open Question-Answer (QA), closed QA, brainstorming, chat, rewriting, summarization, classification, extraction, or other.

System 100 can further include language model (LM) access engine 106. Language model access engine 106 may access a language model from language model based on one or more desired output behaviors or user intent derived from the set of user instructions as in 101b. In some embodiments, language model access engine 106 may access a language model based on a set of model parameters 101c. In some embodiments, language model access engine 106 may access a language model based on the output of a sentiment analysis. In some embodiments, language model access engine 106 may access the language model based on a training dataset as exemplified by training datasets 130, which may include sample data input. In some embodiments, the training dataset may also include sample output data based on the sample data input. In some embodiments, the training dataset may also include annotated data, labeled data, or other types of enriched data. In some embodiments, accessing the language model may include at least one of adding, removing, modifying a model parameter of the language model, or any other model training operation discussed below, such as with respect to FIG. 11. For example, language model access engine 106 may add, deactivate. or remove a node and/or layer of the model. As another non-mutually exclusive example, language model access engine 106 may add or remove a connection between nodes within the language model. In some embodiments, Language model access engine 106 may execute (e.g., perform) access of the language model based on a set of demonstration data. In some embodiments, language model access engine 106 may use the demonstration data as validation data to determine quality scores or other metrics of model output, to train a language model to generate improved digital text outputs. In some embodiments, language model access engine 106 may execute (e.g., perform) alignment using a machine learning algorithm. In some embodiments, the machine learning algorithm may include a reinforcement learning algorithm, such as proximal policy optimization. In some embodiments, aligning the language model may include maximizing a helpfulness metric of one or more model outputs. In some embodiments, a helpfulness metric of the one or more outputs may be computed (e.g., by at least one processor) based on user-labeled data (e.g., by executing one or more comparisons between one or more outputs and user-labeled data associated with respective helpfulness metrics). In some embodiments, aligning the language model may include maximizing an outcome metric of one or more model outputs. In some embodiments, the outcome metrics of the one or more outputs may be computed based on user-labeled data (e.g., by executing one or more comparisons between one or more outputs and user-labeled data associated with respective outcome metrics). In some embodiments, the language model is configured to output the language model output text based on at least one of a sampling temperature parameter or a nucleus sampling parameter. In some embodiments, the language model is configured to output text by selecting text (e.g., word sequences) based on the probability of the output text in a probability distribution of a sampling temperature parameter or a nucleus sampling parameter.

In some embodiments, the outcome metric may be associated with (e.g., represent, indicate, comprise) maximization of output based on the output of context analysis based on context analysis engine 108. In some embodiments, the outcome metric may be associated with (e.g., represent, indicate, comprise) maximization of output based on the output of sentiment analysis.

System 100 can further include context analysis engine 108. Context Analysis Engine 108 may receive normalized input data and user instructions from Data Input Engine 102. In some embodiments, context analysis engine 108 may analyze the input data and/or the user instructions to output a set of context parameters associated with the input data. For instance, the set of context parameters may comprise a location ("where"), a person ("who"), a time period or time of day ("when"), an event ("what"), or causal reasoning ("why") associated with the input data. In some embodiments, context analysis engine 108 may retain the output of the set of context parameters through multiple iterations of editing as performed by text editing engine 110, allowing for retention of context information for changes (e.g., local edits) without needing reload large amounts of information.

System 100 can further include text editing engine 110. Text editing engine 110 may perform editing of the input data 101a based on the set of user instructions 101b. For instance, if the input data comprises a null set (e.g., there is no user input or no natural language input), and a user instruction comprises "add a short poem about Chatbots", Text editing engine 110 may generate text in the form of a short poem in accordance with the specified topic (e.g., Chatbots). In another example, if the input data contains the sentence "Peter is a nice person", and the user instruction includes "make this in the voice of Peter", text editing engine 110 may generate output in the form of "I am a nice person." (emphasis added). In another example, if the user instruction includes "format this like a letter and sign it Mary K.", then Text editing engine 110 may edit the input data into a letter format with the appropriate signature. In another example, if the user instruction includes "convert the list to JSONL file" or "turn this list into YAML and return from a function called get_yaml", text editing engine 110 may generate computer code in accordance with the user instruction in the appropriate programming language. In some embodiments, Text editing engine 110 may perform editing of the input data 101a based on the set of model parameters 101c. For instance, if the model parameter comprises a tone of voice (e.g., stern, kind, funny) or a tone of voice is detected from sentiment analysis, text editing engine 110 may edit the input data accordingly in the desired tone. In some embodiments, text editing engine 110 may perform editing of the input data 101a based on the output of context analysis engine 108. For instance, text editing engine 110 may change properties associated with the author of the input data (e.g., the gender, the point-of-view of the author) based on identification from the output of context analysis engine 108. In some embodiments, text editing engine 110 may perform local or minor changes to the input data (e.g., in the form of a few words or letters) based on the context (e.g., the enclosing sentence or paragraph) as determined by the context analysis engine 108. Embodiments of text editing engine 110 are exemplified in FIGS. 3, 6 and 7.

System 100 can further include output generation engine 112. Output generation engine 112 may receive a set of edited data from Text Editing Engine 110 and output the edited data to at least one of another engine, another system, or a device (e.g., a user device). In some embodiments, the length of the output data is constrained by a length parameter of the language model, which may set a fixed or variable limit on the length of output data (e.g., generated text or code). In some embodiments, the length parameter may be influenced by a user input. For instance, the length of the output data may be constrained to be equivalent to the length of the input data, or to be proportional (e.g., 2×) to the length of the input data. As another example, the length of the output data may be constrained to be less than or equal to a fixed number of characters, words, or sentences, or combination thereof.

System 100 can further include output validation engine 114. In some embodiments, output validation engine 114 may receive a set of model outputs, user-labelled outputs, or a set of comparison data. Output validation engine 114 may execute a ranking of the received model outputs based on the set of user instructions, the output from context analysis engine 108, or the output from sentiment analysis. In some embodiments, output validation engine 114 may also rank the received model outputs based on an outcome metric. In some embodiments, output validation engine 114 may rank the received outputs based on a proximity metric to one or more desired output behaviors.

System 100 can further include LM optimization engine 116. LM optimization engine 116 may perform optimization by aligning or fine-tuning a language model from language model access engine 106, based on one or more desired output behaviors or user intent derived from a set of user instructions as in 101b. In some embodiments, LM optimization engine 116 may align a language model based on the output of sentiment analysis. In some embodiments, LM optimization engine 116 may align the language model based on a training dataset as exemplified by training datasets 130, which may include sample data input. In some embodiments, the training dataset may also include sample output data based on the sample data input. In some embodiments, the training dataset may also include at least one of annotated data, labeled data, or other types of enriched data. In some embodiments, aligning the language model may include at least one of adding, removing, modifying a model parameter of the language model, or any other model training operation discussed below, for example with respect to FIG. 11. For example, the at least one processor may add, deactivate, or remove a node and/or layer of the model. As another non-mutually exclusive example, the at least one processor may add or remove a connection between nodes within the language model. In some embodiments, LM optimization engine 116 may execute (e.g., perform) the alignment of the language model based on a set of demonstration data. In some embodiments, LM optimization engine 116 may use the demonstration data as validation data to determine quality scores or other metrics of model output, to train a language model to generate improved digital text outputs. In some embodiments, LM optimization engine 116 may execute (e.g., perform) alignment using a machine learning algorithm. In some embodiments, the machine learning algorithm may include a reinforcement learning algorithm, such as proximal policy optimization. In some embodiments, aligning the language model may include maximizing a helpfulness metric of one or more model outputs. In some embodiments, a helpfulness metric of the one or more outputs may be computed based on user-labeled data (e.g., by executing one or more comparisons between one or more outputs and user-labeled data associated with respective helpfulness metrics). In some embodiments, aligning the language model may include maximizing an outcome metric of one or more model outputs. In some embodiments, the outcome metrics of the one or more outputs may be computed based on user-labeled data (e.g., by executing one or more comparisons between one or more outputs and user-labeled data associated with respective outcome metrics).

Figure 2:
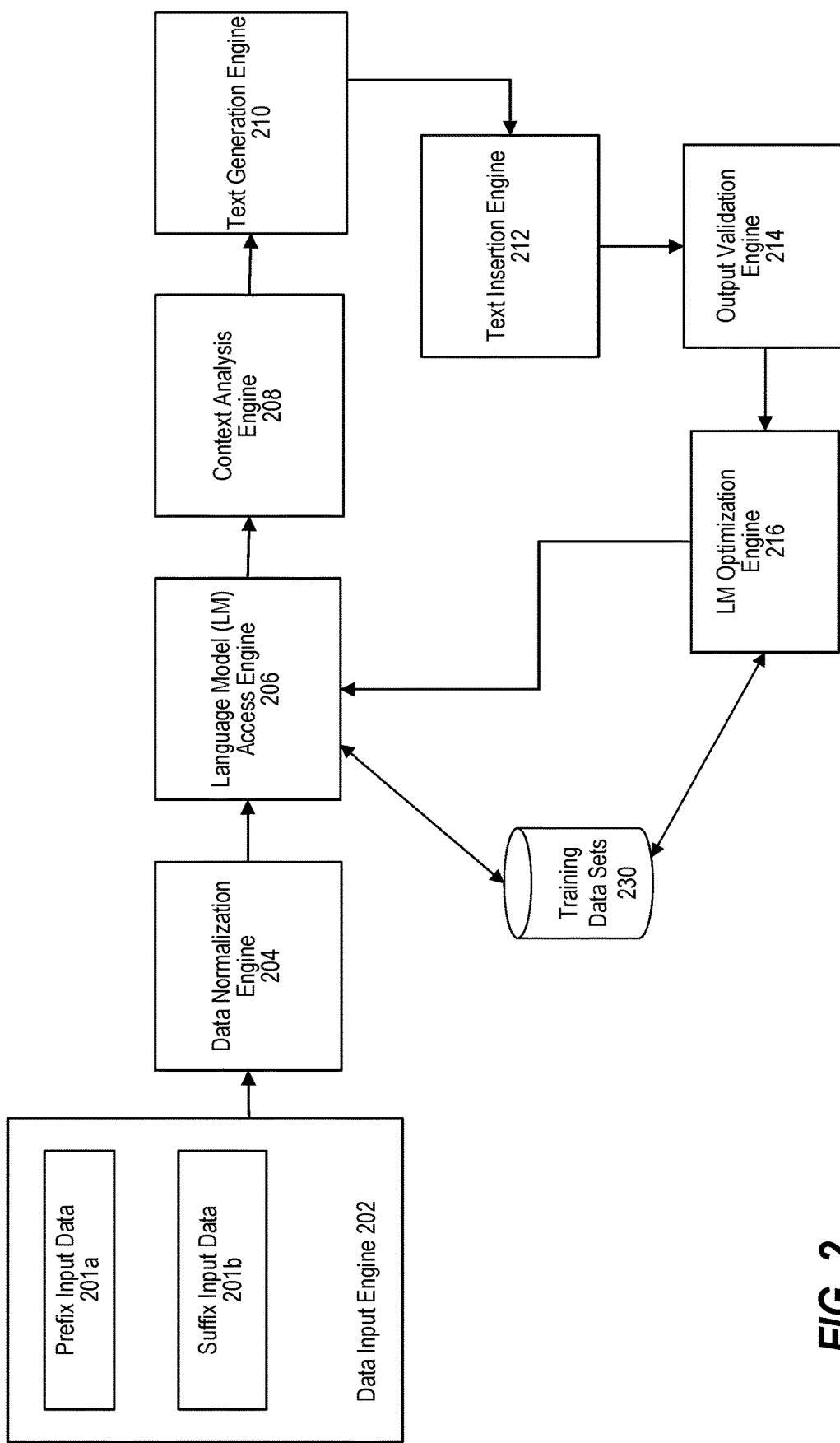
FIG. 2 is a block diagram illustrating an exemplary system for automatically generating and insert text.

FIG. 2 is a block diagram illustrating an exemplary system for automatically generating and insert text.

System 200 can include data input engine 202. Data input engine 202 may obtain data directly from external user devices. Data input engine 202 may obtain prefix input data 201a, and/or suffix input data 201b. Prefix input data 201a may comprise the prefix portion of an input text prompt. Suffix input data 201b may comprise the suffix portion of an input text prompt. In some embodiments, prefix and suffix input data may be user-defined or machine-generated. In some embodiments, prefix input data may comprise text preceding an insertion point, and suffix input data may comprise text following an insertion point. In some embodiments, the length of the prefix or suffix input data may be determined by a language model or by user input. Input data may comprise text data in the form of a sentence, a phrase, a paragraph, or any combination of characters. In some embodiments, user input data may comprise an input text prompt. In some embodiments, input data may comprise computer code. Prefix input data 201a may comprise of a null set. Suffix input data 201b may also comprise of a null set (e.g., having a prefix input only without any suffix). In some embodiments, data input engine 202 may obtain user instructions, comprising text data in the form of a phrase, a sentence, a paragraph, a user prompt, or any combination of characters. In some embodiments, user instructions may be user-specified natural language instructions. For instance, a user instruction may comprise "draft this in letter format using my name" or "make this in the voice of user 273." In some embodiments, data input engine 202 may also obtain a set of model parameters. In some embodiments, the set of model parameters may comprise a tone (e.g., stern, kind, funny), a structure (e.g., prose, free narrative), or format (e.g. poem, formal letter) associated with the input data. In some embodiments, model parameters may comprise properties associated with an author of the input text prompt (e.g., gender, point-of-view).

System 200 can further include data normalization engine 204. Data normalization engine 104 may perform tokenization of input data. Data normalization engine 204 may also perform lemmatization, stemming, and part-of-speech tagging of input data. In some embodiments, data normalization engine 204 may perform normalization based on the length of user input data or the desired length of output based on a user instruction or model parameters. In some embodiments, data normalization engine 204 may perform normalization based on a set of model parameters. In some embodiments, a language model application framework may correspond to at least one of generation, open Question-Answer (QA), closed QA, brainstorming, chat, rewriting, summarization, classification, extraction, or other.

System 200 can further include language model (LM) access engine 206. Language model access engine 206 may access a language model from language model based on one or more desired output behaviors or user intent derived from the set of user instructions as in 101b. In some embodiments, language model access engine 206 may access a language model based on a set of model parameters. In some embodiments, language model access engine 206 may access a language model based on the output of a sentiment analysis. In some embodiments, LM model access engine 206 may access the language model based on a training dataset as exemplified by training datasets 230, which may include sample data input. In some embodiments, the training dataset may also include sample output data based on the sample data input. In some embodiments, the training dataset may also include annotated data, labeled data, or other types of enriched data. In some embodiments, accessing the language model may include at least one of adding, removing, modifying a model parameter of the language model, or any other model training operation discussed below, such as with respect to FIG. 11. For example, language model access engine 206 may add, deactivate, or remove a node and/or layer of the model. As another non-mutually exclusive example, language model access engine 206 may add or remove a connection between nodes within the language model. In some embodiments, Language model access engine 206 may execute (e.g., perform) access of the language model based on a set of demonstration data. In some embodiments, language model access engine 206 may use the demonstration data as validation data to determine quality scores or other metrics of model output, to train a language model to generate improved digital text outputs. In some embodiments, language model access engine 206 may execute (e.g., perform) alignment using a machine learning algorithm. In some embodiments, the machine learning algorithm may include a reinforcement learning algorithm, such as proximal policy optimization. In some embodiments, aligning the language model may include maximizing a helpfulness metric of one or more model outputs. In some embodiments, a helpfulness metric of the one or more outputs may be computed based on user-labeled data (e.g., by executing one or more comparisons between one or more outputs and user-labeled data associated with respective helpfulness metrics). In some embodiments, aligning the language model may include maximizing an outcome metric of one or more model outputs. In some embodiments, the outcome metrics of the one or more outputs may be computed based on user-labeled data (e.g., by executing one or more comparisons between one or more outputs and user-labeled data associated with respective outcome metrics). In some embodiments, the outcome metric may be associated with (e.g., represent, indicate, comprise) maximization of output based on the output of context analysis based on context analysis engine 208. In some embodiments, the outcome metric may be associated with (e.g., represent, indicate, comprise) maximization of output based on the output of sentiment analysis. In some embodiments, the language model may be configured to output the language model output text based on at least one of a sampling temperature parameter or a nucleus sampling parameter. A sampling temperature parameter (e.g., a decimal value) may be a model parameter that influences or controls a degree to which the model operates to be more random or more deterministic. A nucleus sampling parameter (e.g., a decimal value) may be a model parameter that influences or controls which token results the model considers (e.g., 0.1 may cause the model to only consider results of tokens with the top 10% probability mass). In some embodiments, the language model may be configured to output text by selecting text (e.g., word sequences) based on the probability of the output text in a probability distribution using a sampling temperature parameter or a nucleus sampling parameter.

System 200 can further include context analysis engine 208. Context Analysis Engine 208 may receive normalized prefix input data and/or suffix input data from Data Input Engine 102. In some embodiments, context analysis engine 108 may analyze prefix input data and suffix input data to output a set of context parameters associated with the input data. In some embodiments, context analysis engine 208 may analyze the prefix input data without suffix data. For instance, the set of context parameters may comprise a location ("where"), a person ("who"), a time period or time of day ("when"), an event ("what"), or causal reasoning ("why") associated with the input data. In some embodiments, context analysis engine 208 may retain the output of the set of context parameters through multiple iterations of editing as performed by text editing engine 110, allowing for retention of context information for changes (e.g., local edits) without needing reload large amounts of information.

System 200 can further include text generation engine 210. Text generation engine 210 may perform generation of text based on prefix input data 201a and/or suffix input data 201b. In some embodiments, text generation engine may also perform generation of text based on a set of user instructions or a set of model parameters. In some embodiments, text generation engine may also perform generation of text based on the output of context analysis engine 208. For instance, if the prefix input data comprises "High school graduation—today is the big day!" or context parameter output from context analysis engine 208 comprises "high school graduation", text generation engine 210 may generate text relating to high school graduation (e.g., "congratulations to all our high school graduates", or "enjoy your graduation ceremonies and best of luck in your future endeavors."). Additionally, in the present example, if suffix input data is also received by data input engine 202, which states "I am moving to San Francisco", or if context parameter output from context engine 218 comprises "moving to San Francisco", text generation engine 210 may generate text based on both prefix input data and suffix data (e.g., "I am graduating from high school today, and I am excited to move to San Francisco."). In another example in a computer code setting (See, e.g. FIG. 5, 504), if the prefix input data comprises a definition for function A, and the suffix input data comprises a reference to an undefined function B, text generation engine 210 may generate computer code with an appropriate definition of function B referencing function A. Additionally, as discussed below, text insertion engine 212 may determine the appropriate insertion point for the generated code of function B and insert the generated function. In some embodiments, Text generation engine 210 may perform text generation based on a set of model parameters. For instance, if the model parameter comprises a tone of voice (e.g., stern, kind, funny) or a tone of voice is determined based on a sentiment analysis, text generation engine 210 may generate text in accordance with the desired tone (e.g., based on learned associations between tone and corresponding text). In some embodiments, text editing engine 110 may perform text generation based on identified context parameters from the output of context analysis engine 208 (e.g., the gender, the point-of-view of the author). In some embodiments, text editing engine 210 may perform local or minor changes to the input data (e.g., in the form of a few words or letters) based on the context (e.g., the enclosing sentence or paragraph) as determined by the context analysis engine 208. In some embodiments, text generation engine 210 constrains the length of the generated text based on the language model from language model access engine 206. In some embodiments, text generation engine 210 constrains the length of the generated text based on user instruction, model parameters, or the length of prefix input data and/or the length of suffix input data. In some embodiments, the length of the generated text is constrained by a length parameter of the language model and the length parameter may be influenced by a user input, as discussed above.

System 200 can further include text insertion engine 212. In some embodiments, text insertion engine 212 may receive generated text from text generation engine 210. In some embodiments, text insertion engine 212 may identify an insertion position based on the language model from language model access engine 206. Additionally or alternatively, text insertion engine 212 may identify an insertion position based on a user input (e.g., a user input received at an interface that specifies a position, area, or segment within a pre-existing text area for the insertion). In some embodiments, the insertion position is between the prefix input data and suffix data. In some embodiments (e.g. in a computer coding environment, See e.g. FIG. 5), text insertion engine 212 may determine an appropriate insertion point based on the prefix code segment and/or suffix code segment. In some embodiments, text insertion engine 212 may insert the generated text at the insertion position.

Figure 3:
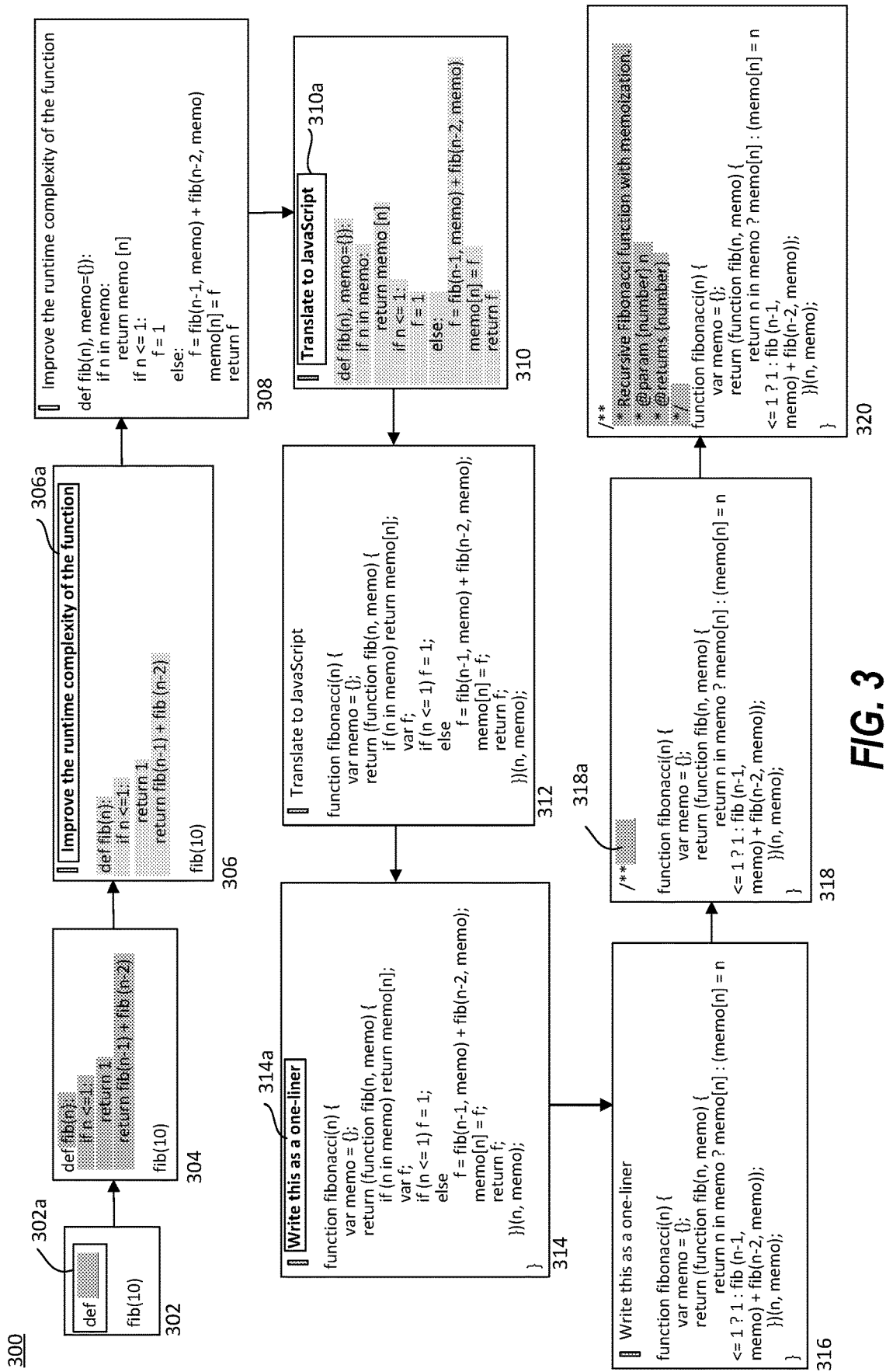
FIG. 3 illustrates an exemplary iterative process for automatically editing and inserting text, according to some embodiments of the present disclosure.
Figure 4:
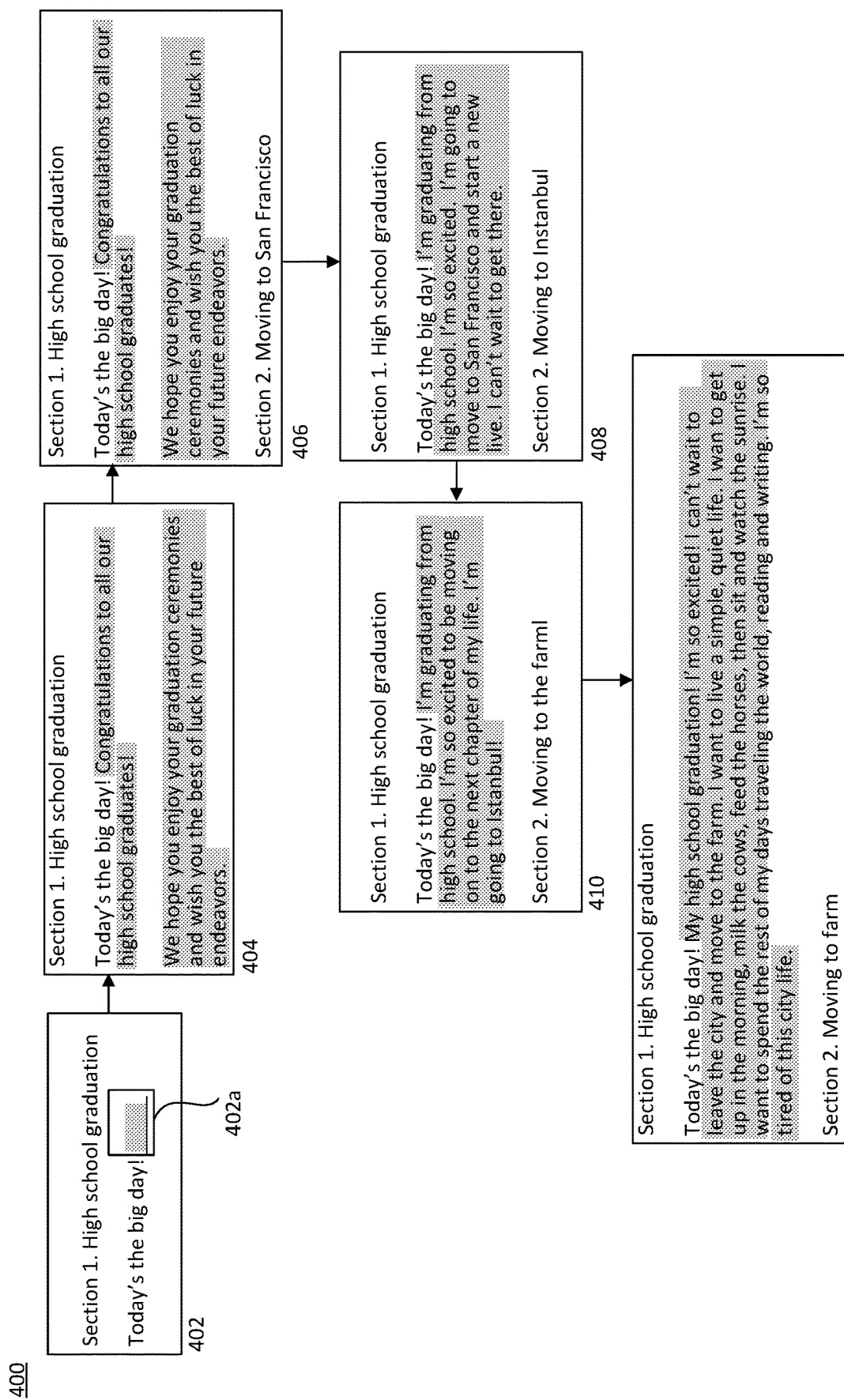
FIG. 4 illustrates an exemplary iterative process for automatically inserting text, according to some embodiments of the present disclosure.
Figure 5:
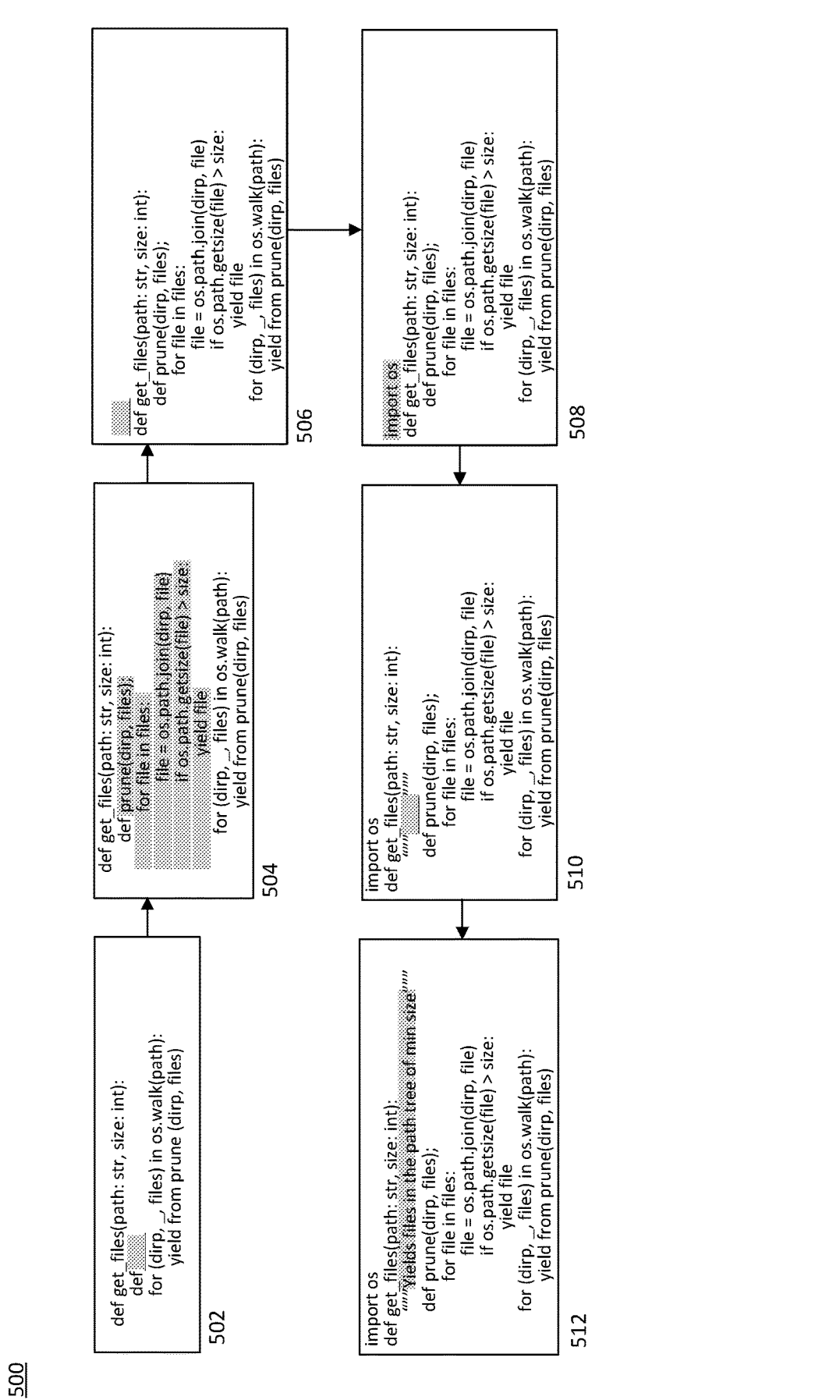
FIG. 5 illustrates an exemplary iterative process for automatically inserting text, according to some embodiments of the present disclosure.

Embodiments of text generation engine 210 and text insertion engine 212 are exemplified in FIGS. 3-5.

System 200 can further include output validation engine 214. In some embodiments, output validation engine 214 may receive a set of model outputs, user-labelled outputs, or a set of comparison data. Output validation engine 214 may execute a ranking of the received model outputs based on the set of user instructions, the output from context analysis engine 208, or the output from sentiment analysis. In some embodiments, output validation engine 214 may also rank the received model outputs based on an outcome metric. In some embodiments, output validation engine 214 may rank the received outputs based on a proximity metric to one or more desired output behaviors.

System 200 can further include LM optimization engine 216. LM optimization engine 216 may perform optimization by aligning or fine-tuning a language model from language model access engine 206, based on one or more desired output behaviors or user intent derived from prefix input data, suffix input data, and/or output from context analysis engine 208. In some embodiments, LM optimization engine 216 may align a language model based on the output of sentiment analysis. In some embodiments, LM optimization engine 216 may align the language model based on a training dataset as exemplified by training datasets 230, which may include sample data input. In some embodiments, the training dataset may also include sample output data based on the sample data input. In some embodiments, the training dataset may also include annotated data, labeled data, or other types of enriched data. In some embodiments, aligning the language model may include at least one of adding, removing, modifying a model parameter of the language model, or any other model training operation discussed below, such as with respect to FIG. 11. For example, the at least one processor may add, deactivate, or remove a node and/or layer of the model. As another non-mutually exclusive example, the at least one processor may add or remove a connection between nodes within the language model. In some embodiments, LM optimization engine 216 may execute (e.g., perform) the alignment of the language model based on a set of demonstration data. In some embodiments, LM optimization engine 216 may use the demonstration data as validation data to determine quality scores or other metrics of model output, to train a language model to generate improved digital text outputs. In some embodiments, LM optimization engine 216 may execute (e.g., perform) alignment using a machine learning algorithm. In some embodiments, the machine learning algorithm may include a reinforcement learning algorithm, such as proximal policy optimization. In some embodiments, aligning the language model may include maximizing a helpfulness metric of one or more model outputs. In some embodiments, a helpfulness metric of the one or more outputs may be computed based on user-labeled data (e.g., by executing one or more comparisons between one or more outputs and user-labeled data associated with respective helpfulness metrics). In some embodiments, aligning the language model may include maximizing an outcome metric of one or more model outputs. In some embodiments, the outcome metrics of the one or more outputs may be computed based on user-labeled data (e.g., by executing one or more comparisons between one or more outputs and user-labeled data associated with respective outcome metrics). In some embodiments, the outcome metric may be associated with (e.g., represent, indicate, comprise) maximization of output based on the output of context analysis based on context analysis engine 108 from context analysis engine 208. In some embodiments, the outcome metric may be associated with (e.g., represent, indicate, comprise) maximization of output based on the output of sentiment analysis. In some embodiments, aligning the language model may include minimizing harmful output generated by the language model. In some embodiments, the minimizing of harmful output may be executed (e.g., performed) based on a risk-of-harm metric. In some embodiments, the risk-of-harm metric may measure at least one of a biased output, misinformation, or a malicious output. A biased output may include at least one of a social bias or stereotype. In some embodiments, language model access engine 106 may align a language model to maximize the proximity of its outputs to the one or more desired behavior outputs (e.g., maximize a quality score or a numerical similarity score of output data). In some embodiments, language model access engine 106 may align a language model to maximize any combinations of a helpfulness metric, a truthfulness metric, or a proximity of its output to desired model behavior output(s) while minimizing any combinations of one or more risk-of-harm metrics.

FIG. 3 illustrates an exemplary iterative process for automatically editing and inserting text, according to some embodiments of the present disclosure. Instruction segments 302a, 306a, 310a, 314a. and 318a each represent exemplary user instructions, which may be provided within a user interface (e.g., displayed at a computing device). Instruction segment 302 represents exemplary input data as exemplified by user input data 101a received by data input engine 102 or prefix input data 201a or suffix input data 201b received by data input engine 202. Instruction segments 304, 306, 308, 310, 312, 314, 316, 318, and 320 represent exemplary iterative changes (in the form of edits or insertions) to the input data based on the corresponding user instructions.

FIG. 4 illustrates an exemplary iterative process for automatically inserting text, according to some embodiments of the present disclosure. Portion 402a represents an exemplary point of insertion. 402 represents exemplary input data as exemplified by prefix input data 201a or suffix input data 201b received by data input engine 202. Text portions 404, 406, 408, 410, and 412 represent exemplary iterative insertional changes to the input data based on the corresponding suffix input data.

FIG. 5 illustrates an exemplary iterative process for automatically inserting text in a computer coding environment, according to some embodiments of the present disclosure. Input code 502 represents exemplary input data as exemplified by prefix input data 201a or suffix input data 201b received by data input engine 202. Code portions 504, 506, 508, 510, and 512 represent exemplary iterative insertional changes to the input data based on the corresponding prefix or suffix input data.

Figure 6:
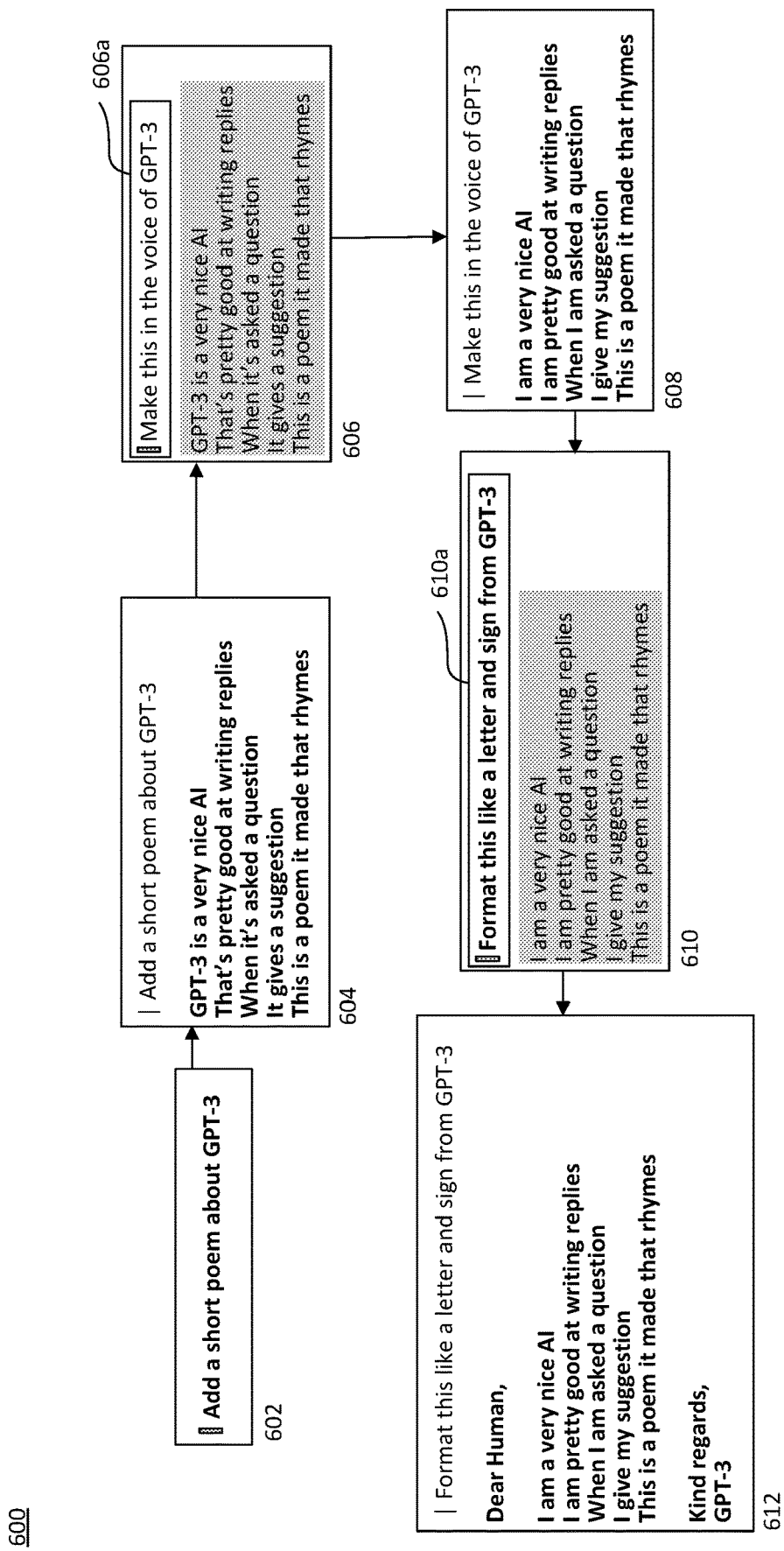
FIG. 6 illustrates an exemplary iterative process for automatically editing text, according to some embodiments of the present disclosure.

FIG. 6 illustrates an exemplary iterative process for automatically editing text, according to some embodiments of the present disclosure. Instruction segments 606a and 610a represent exemplary user instructions. Prompt 602 represents exemplary input data as exemplified by user input data 101a received by data input engine 102. Text portions 604, 606, 608, 610, and 612 represent exemplary iterative edited changes to the input data based on the corresponding user instructions.

Figure 7:
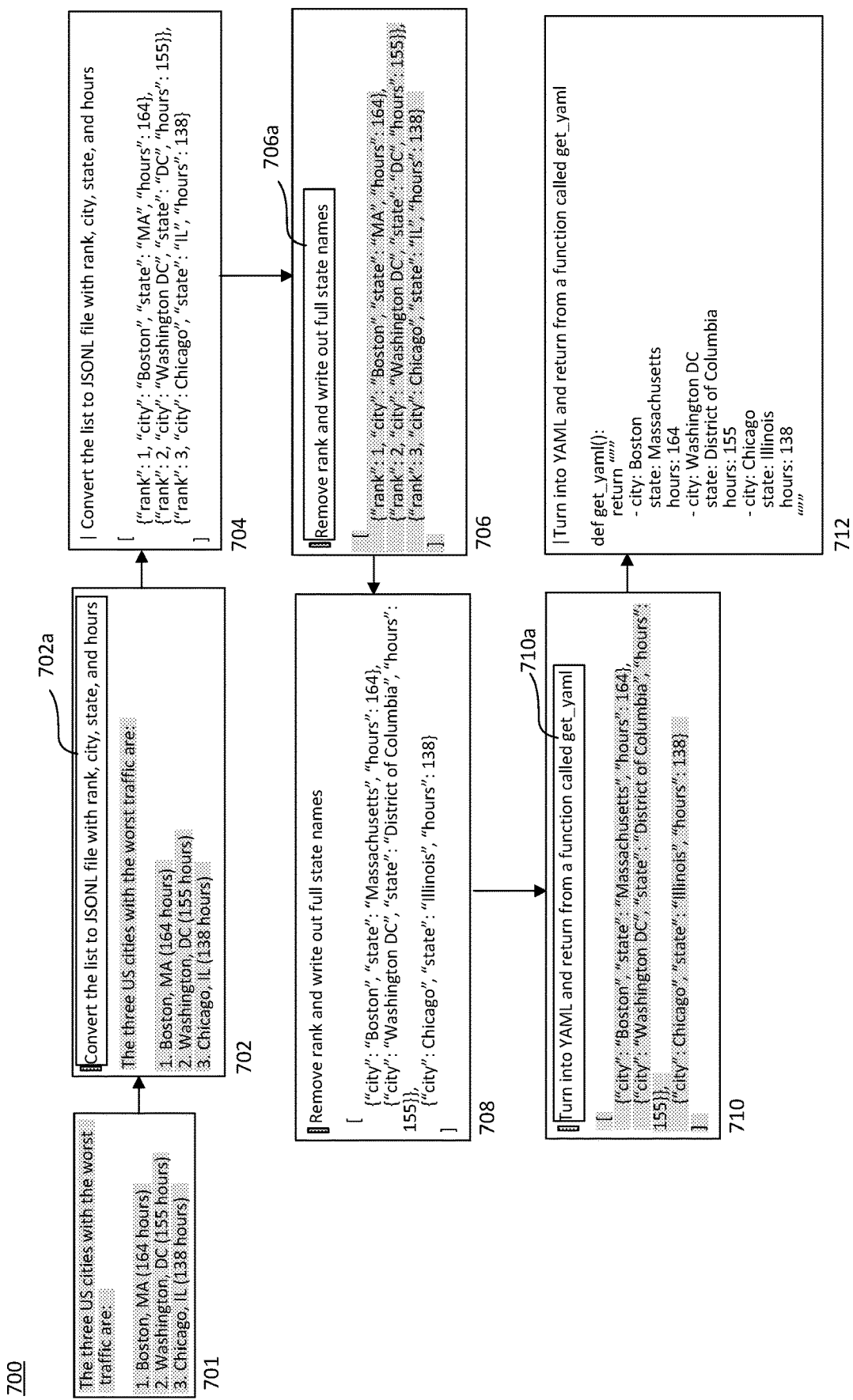
FIG. 7 illustrates an exemplary iterative process for automatically editing text, according to some embodiments of the present disclosure.

FIG. 7 illustrates an exemplary iterative process for automatically editing text in a computer coding environment, according to some embodiments of the present disclosure. Prompts 702a, 706a, and 710a represent exemplary user instructions. Text portion 701 represents exemplary input data as exemplified by user input data 101a received by data input engine 102. Text portions 702, 704, 706, 708, 710, and 712 represent exemplary iterative edited changes to the input data based on the corresponding user instructions.

Figure 8:
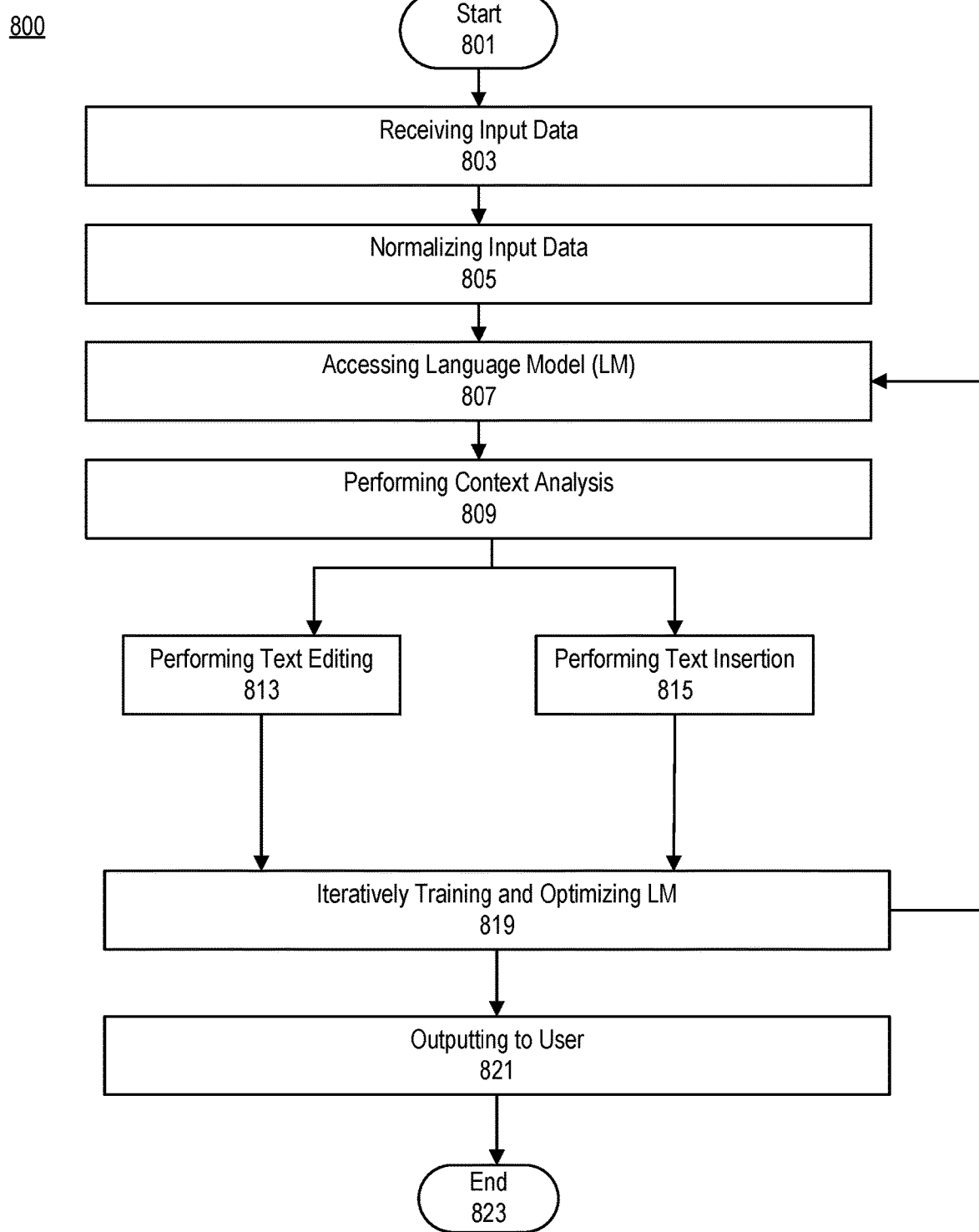
FIG. 8 is a flow diagram illustrating an exemplary process for generating text and performing editing or insertion of text using a language model-based approach, according to some embodiments of the present disclosure.

FIG. 8 is a flow diagram illustrating an exemplary process for generating text and performing editing or insertion of text using a language model-based approach, according to some embodiments of the present disclosure.

Process 800 can be performed (e.g., executed) by a system, such as system 100 of FIG. 1, system 200 of FIG. 2, or any computing device. In some embodiments, process 800 can be implemented using at least one processor (e.g., processor 1006), which may execute one or more instructions that can be stored on a computer-readable medium (e.g., storage device 1008 of FIG. 10). While the steps in FIG. 8 are shown in a particular exemplary order, it is appreciated that the individual steps may be reordered, omitted, and/or repeated.

In some embodiments, process 800 begins at step 803. At step 803, at least one processor may receive input data from one or more data sources. A data source may include a user device, a webpage, a data storage medium, or any other repository of text data. Input data may include at least one of user-labeled data, unlabeled data, or publicly available data (which may or may not be labeled). For example, step 803 may include receiving an input text prompt, which may include an amount of text, which may have been input at a user device (e.g., to a user interface linked to a language model through an API). For example, input data may include one or more of a user-written or machine-written prompt, a user-written or machine-written instruction, web-crawled text, or any other text data (e.g., one or more words, phrases, sentences, or paragraphs). Additionally or alternatively, step 803 may include receiving one or more user instructions, such as where input data includes at least one of user instructions or prompts, discussed further herein. In some embodiments, at least one processor may be configured to input the sample data input to an API (e.g., to obtain a score, such as a toxicity score), which may be performed prior to performing additional operations on the sample data input. In some embodiments, user data may include one or more user-generated and/or machine-generated metadata and/or labels (e.g., identifying a topic of the text data) that provide enhanced digital structure to the sample data input, which can reduce processing strain during training and generate more accurate machine learning models. Receiving input data may include accessing input data from a storage device (e.g., remote or local storage device), requesting input data (e.g., from a remote or local device), or performing any operation to determine text data based on input data. In some embodiments, receiving input data may include receiving a first input prompt from a user device. In some embodiments, user data input may be exemplified by user input data 101a as in FIG. 1. In some embodiments, one or more prompts may be generated directly by external users. A prompt may include at least one of user instructions or a user-defined task.

In some embodiments, input data may comprise demonstration data. Demonstration data may include labeled data collected from one or more user devices (e.g., computing devices 1002). In some embodiments, the labeled data may include data demonstrating one or more desired output behaviors for the language model. Labeled data may include an amount of text (e.g., a paragraph, a sentence) that is user-generated, machine-generated, or a combination of both. Labeled data may also include digital identifiers (e.g., unique identifiers) and/or metadata, which may be associated with an amount of text. For example, a digital identifier may identify a particular block of text as associated with a particular tone, style, sociolinguistic register, readability score, reading level, topic, content, or other contextual information. In some embodiments, the labeled data may include data which reflects user intent (e.g., intended output data based on particular input data). In some embodiments, demonstration data may be used as validation model to validate a language model as part of a machine learning process (e.g., as discussed below with respect to step 817). Using training data (e.g., text data, code data) together with associated labels represents robust data that improves the complex technical process of accurately training a language-based machine learning model. In some embodiments, the system may use the labeled data based on (e.g., using) an engine, such as language model (LM) optimization engine 116 in FIG. 1 or 216 in FIG. 2, to fine-tune the alignment of a language model to the desired output behavior.

At step 805, at least one processor may normalize the input data (e.g., discarding input data outside of a length range). Normalizing input data may include tokenizing input data and applying a token-length filter to the tokenized input data. In some embodiments, prompts may correspond to language model application frameworks in language model applications. The system may execute prompt generation based on (e.g., using) a prompt generation engine.

At step 807, the at least one processor may access or select a language model. In some embodiments, the selection of the language model may be based on the received input data. In some embodiments, at least one processor may access a language model based on the input text prompt and one or more user instructions (e.g., received at step 803 and/or normalized at step 805). For example, the at least one processor may determine that the selected language model matches a label included with the input data and/or may determine a semantic similarity between at least a portion of the input data and the selected language model (e.g., by computing distances between a text embedding associated with sample data input and a text embedding associated with one or more language models from which the selection is made).

At step 809, the at least one processor may perform context analysis (e.g., in response to and/or based on the input data). In some embodiments, the context analysis may be performed from context analysis engine 108 from FIG. 1 or context analysis engine 208 from FIG. 2. In some embodiments, output from context analysis may include identification of a set of relevant context parameters from a user prompt or a user instruction. In some embodiments, output from context analysis may include identification of relevant context parameters from a prefix user prompt or a suffix user instruction.

At step 813, the at least one processor may perform text generation and text editing of an input text prompt using exemplary text editing engine 110 from FIG. 1. In some embodiments, the at least one processor may edit an input text prompt based on the language model and/or the one or more user instructions. For example, the at least one processor may edit an input text prompt by replacing (e.g., within an interface, such as in real time) at least a portion of the input text prompt with language model output text. In some embodiments, the at least one processor may edit (e.g., based on the language model and/or input data) pre-existing code, such as by refactoring code, adding documentation, translating between programming languages, or changing code style. For example, the at least one processor may edit JavaScript Object Notation (JSON) code by removing, adding, refactoring, or translating code within a JSON file. In some embodiments, the text generation and text editing is performed using the selected language model as in step 807 and the output from context analysis (e.g., performed at step 809). In some embodiments, the at least one processor may edit an input text prompt while a user is editing or inserting the input text or text distinct from, but which may be associated with (e.g., included in a same interface) the input text prompt. In some embodiments, the at least one processor may generate and insert text into an input text prompt while a user is editing or inserting the input text or text distinct from, but which may be associated with (e.g., included in a same interface) the input text prompt.

At step 815, the at least one processor may perform text generation and text insertion into an input text prompt using exemplary text insertion engine 212 from FIG. 2. In some embodiments, the at least one processor my insert (e.g., based on the language model and/or input data) text or code between portions of a function or a file. In some embodiments, the text generation and text editing is performed using the selected language model as in step 807 and the output from context analysis (e.g., performed at step 809).

At step 819, the at least one processor may perform iterative training and optimization of the language model. For example, the language model may be optimized through one or more iterative cycles of training, which may be based on or more datasets (e.g., different datasets, such as different input or validation data). A cycle of training may include one or more rounds of training, one or more epochs of training, or any number of discrete training operations. In other embodiments, the at least one processor may perform training and optimization of the language model in a non-iterative manner. Alternatively, the language model may already be trained and/or optimized, and step 819 may be skipped or limited (e.g., to only training or only optimization). The at least one processor may also train and optimize the language model by aligning a language model (e.g., the selected language model) to one or more desired output behavior (e.g., user intent or textual context). In some embodiments, the at least one processor may also align a language model based on the output of context analysis from context analysis engine 108 from FIG. 1 or context analysis engine 208 from FIG. 2. In some embodiments, the at least one processor may also align a language model based on the output of sentiment analysis. In some embodiments, the at least one processor may align the language model based on a training dataset, which may include sample data input. In some embodiments, the training dataset may also include sample output data based on the sample data input. In some embodiments, the training dataset may also include annotated data, labeled data, or other types of enriched data. Aligning the language model may include at least one of adding, removing, modifying a model parameter of the language model, or any other model training operation discussed below, such as with respect to FIG. 11. For example, the at least one processor may add, deactivate, or remove a node and/or layer of the model. As another non-mutually exclusive example, the at least one processor may add or remove a connection between nodes within the language model. In some embodiments, the system may execute (e.g., perform) the alignment of the language model based on a set of demonstration data. In some embodiments, the at least one processor may use the demonstration data as validation data to determine quality scores or other metrics of model output, to train a language model to generate improved digital text outputs. In some embodiments, the system may execute (e.g., perform) alignment using a machine learning algorithm. In some embodiments, the machine learning algorithm may include a reinforcement learning algorithm, such as proximal policy optimization. In some embodiments, aligning the language model may include maximizing a helpfulness metric of one or more model outputs. In some embodiments, a helpfulness metric of the one or more outputs may be computed based on user-labeled data (e.g., by executing one or more comparisons between one or more outputs and user-labeled data associated with respective helpfulness metrics). In some embodiments, aligning the language model may include maximizing an outcome metric of one or more model outputs. In some embodiments, the outcome metrics of the one or more outputs may be computed based on user-labeled data (e.g., by executing one or more comparisons between one or more outputs and user-labeled data associated with respective outcome metrics). In some embodiments, the outcome metric may be associated with (e.g., represent, indicate, comprise) maximization of output based on the output of context analysis based on context analysis engine 108 from FIG. 1 or context analysis engine 208 from FIG. 2. In some embodiments, the outcome metric may be associated with (e.g., represent, indicate, comprise) maximization of output based on the output of sentiment analysis. In some embodiments, aligning the language model may include minimizing harmful output generated by the language model. In some embodiments, the minimizing of harmful output may be executed (e.g., performed) based on a risk-of-harm metric. In some embodiments, the risk-of-harm metric may measure at least one of a biased output, misinformation, or a malicious output. A biased output may include at least one of a social bias or stereotype. In some embodiments, language model access engine 106 may align a language model to maximize the proximity of its outputs to the one or more desired behavior outputs (e.g., maximize a quality score or a numerical similarity score of output data). In some embodiments, language model access engine 106 may align a language model to maximize any combinations of a helpfulness metric, a truthfulness metric, or a proximity of its output to desired model behavior output(s) while minimizing any combinations of one or more risk-of-harm metrics.

At step 821, the at least one processor may generate output to a user device (e.g., cause the user device to display information representative of and/or including the output). In some embodiments, the output may include a set of model outputs based on the language model as exemplified in step 807 and 819. In some embodiments, the set of model outputs may be generated from an aligned language model (e.g., a model optimized at step 819). A model output may include an amount of machine-generated natural language text (e.g., one or more words, phrases, or sentences). In some embodiments, the model output may include one or more of annotated data, labeled data, enriched data, speech data (e.g., configured to cause output of computer-generated speech at a speaker or voice-to-text data), or a probability distribution over sequences of words. In some embodiments, the at least one processor may execute a natural language generation (NLG) algorithm to generate at least a portion of the model output. In some embodiments, the model output may include edited text based on an input text prompt. In some embodiments, the model output may include inserted text based on an input text prompt. In some embodiments, a user device may provide evaluation data (e.g., one or more indications of accuracy of model generations), which the model may use for subsequent training, to further improve the accuracy of the model.

Figure 9:
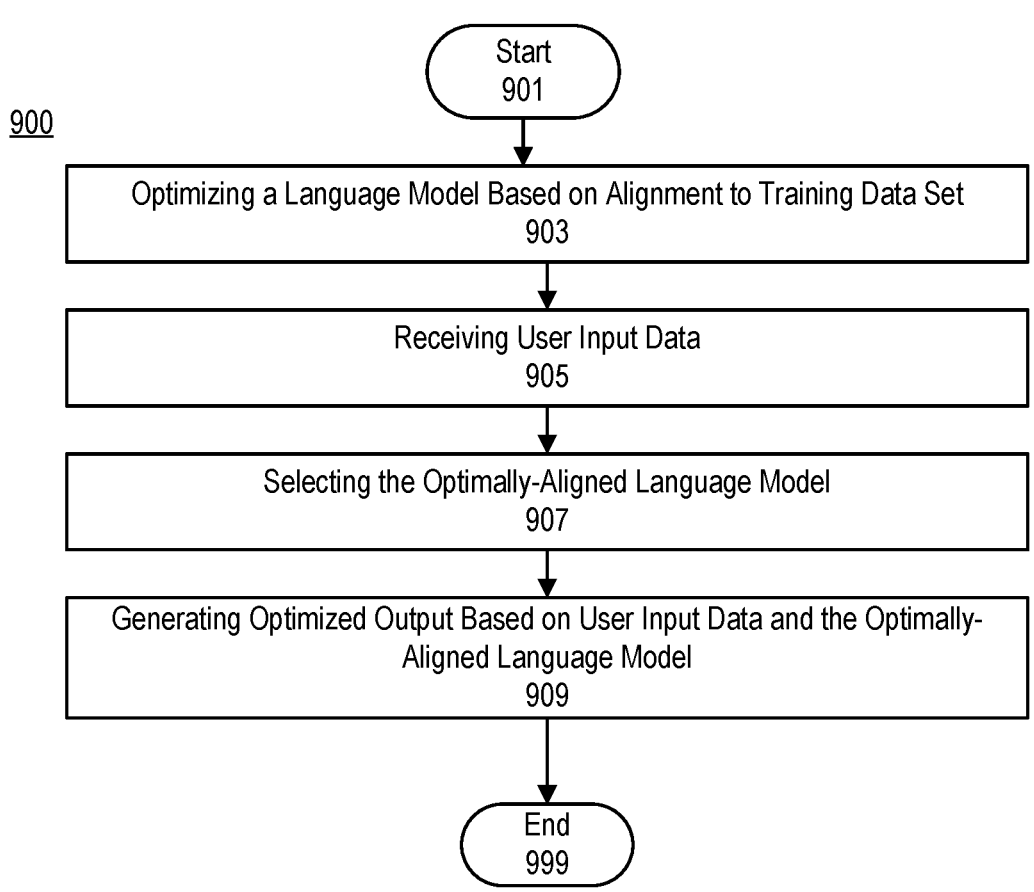
FIG. 9 is a flow diagram illustrating an exemplary process for generating optimized language model outputs based on user input and an optimally-aligned language model.

FIG. 9 is a flow diagram illustrating an exemplary process 900 for generating optimized language model outputs based on received user input data and an optimally-aligned language model (e.g., a model optimized according to at least a part of process 800), according to some embodiments of the present disclosure.

Process 900 can be performed (e.g., executed) by a system, such as system 100 of FIG. 1, system 200 of FIG. 2, or any computing device. In some embodiments, process 900 can be implemented using at least one processor (e.g., processor 1006), which may execute one or more instructions that can be stored on a computer-readable medium (e.g., storage device 1008 of FIG. 10). While the steps in FIG. 9 are shown in a particular exemplary order, it is appreciated that the individual steps may be reordered, omitted, and/or repeated.

In some embodiments, process 900 begins at step 903. At step 903, the system may execute optimization of a language model based on its alignment. In some embodiments, the system may execute optimization of the language model using one or more steps of process 800. In some embodiments, for example the language model is already optimized, process 900 may not involve step 903.

At step 905, the system may receive user input data. In some embodiments, the user input data input may include a user prompt, a set of user instruction, or a set of model-based parameters as exemplified by the data sets 101a-101c as in FIG. 1 or 201a-201b as in FIG. 2. In some embodiments, one or more sets of user input data may be generated directly by external users. A set of user instructions may comprise a user-defined task. In some embodiments, user input data may comprise training data sets. In some embodiments, training data sets may comprise example user prompts.

At step 907, the system may select the optimized language model based on the receiving of the user input data. For example, the at least one processor may determine that the selected optimized language model matches a label included with the user input data and/or may determine a semantic similarity between at least a portion of the user input data and the selected optimized language model (e.g., by computing distances between a text embedding associated with the user input data and a text embedding associated with one or more language models from which the selection is made).

At step 909, the system may generate one or more optimized language model outputs responsive to the user input data. In some embodiments, the system may generate the set of optimized outputs using the selected optimized language model.

Figure 10:
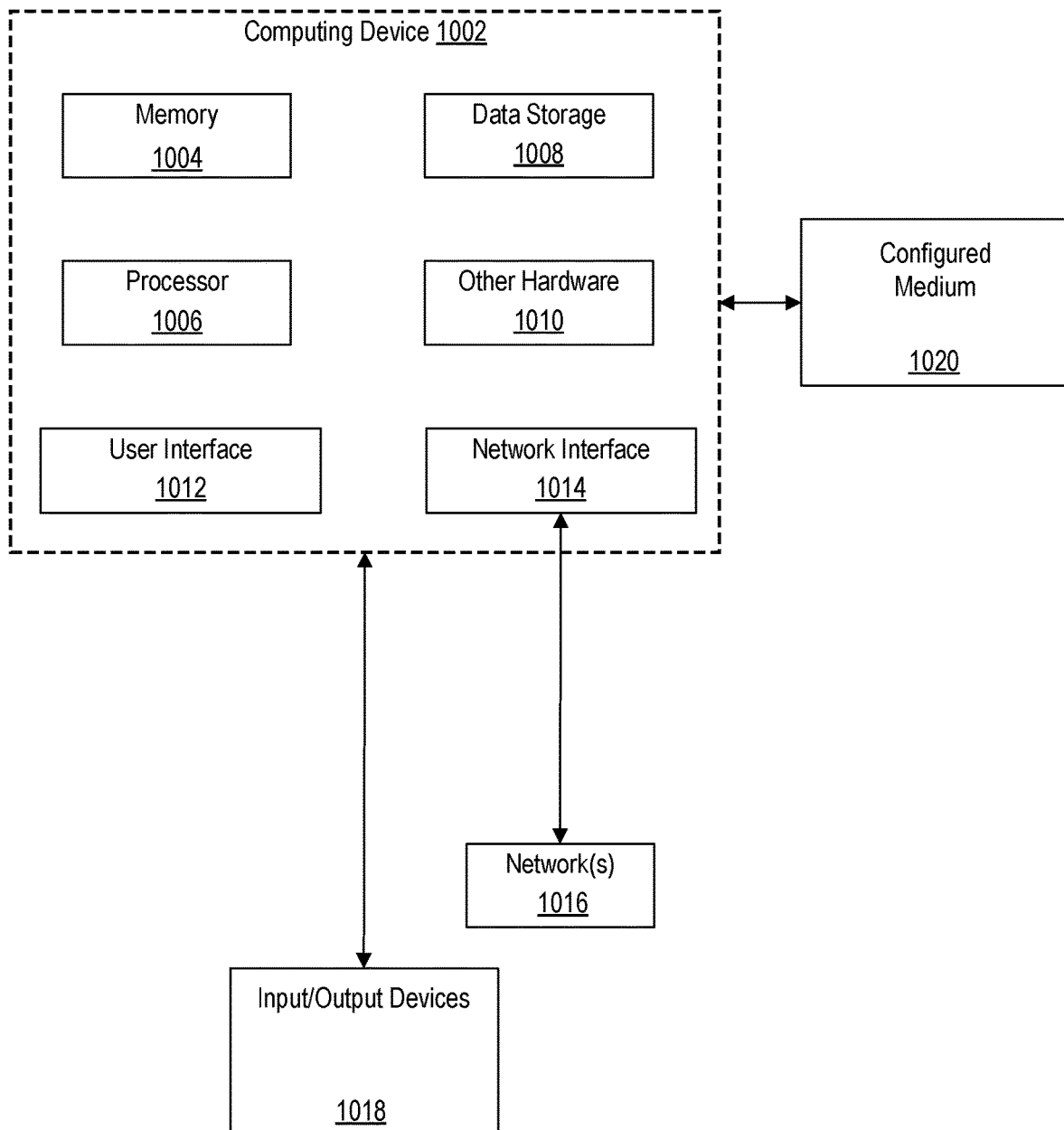
FIG. 10 is a block diagram illustrating an exemplary operating environment for implementing various aspects of this disclosure, according to some embodiments of the present disclosure.

An exemplary operating environment for implementing various aspects of this disclosure is illustrated in FIG. 10. As illustrated in FIG. 10, an exemplary operating environment 1000 may include a computing device 1002 (e.g., a general-purpose computing device) in the form of a computer. In some embodiments, computing device 1002 may be associated with a user. Components of the computing device 1002 may include, but are not limited to, various hardware components, such as one or more processors 1006, data storage 1008, a system memory 1004, other hardware 1010, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 10, an operating environment 1000 for an exemplary embodiment includes at least one computing device 1002. The computing device 1002 may be a uniprocessor or multiprocessor computing device. An operating environment 1000 may include one or more computing devices (e.g., multiple computing devices 1002) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 1002 may be configured for end-users, e.g., with applications, for administrators, as a server, as a distributed processing node, as a special-purpose processing device, or otherwise configured to train machine learning models and/or use machine learning models.

One or more users may interact with the computer system comprising one or more computing devices 1002 by using a display, keyboard, mouse, microphone, touchpad, camera, sensor (e.g., touch sensor) and other input/output devices 1018, via typed text, touch, voice, movement, computer vision, gestures, and/or other forms of input/output. An input/output device 1018 may be removable (e.g., a connectable mouse or keyboard) or may be an integral part of the computing device 1002 (e.g., a touchscreen, a built-in microphone). A user interface 1012 may support interaction between an embodiment and one or more users. A user interface 1012 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 1018 and computing device 1002, based on input received from at user interface 1012 and/or from network(s) 1016. As used throughout, "based on" may refer to being established or founded upon a use of, changed by, influenced by, caused by, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 1002 in other embodiments, depending on their detachability from the processor(s) 1006. Other computerized devices and/or systems not shown in FIG. 1 may interact in technological ways with computing device 1002 or with another system using one or more connections to a network 1016 via a network interface 1014, which may include network interface equipment, such as a physical network interface controller (NIC) or a virtual network interface (VIF).

Computing device 1002 includes at least one logical processor 1006. The computing device 1002, like other suitable devices, also includes one or more computer-readable storage media, which may include, but are not limited to, memory 1004 and data storage 1008. In some embodiments, memory 1004 and data storage 1008 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 1020 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 1002, making its content accessible for interaction with and use by processor(s) 1006. The removable configured medium 1020 is an example of a computer-readable storage medium. Some other examples of computer-readable storage media include built-in random access memory (RAM), read-only memory (ROM), hard disks, and other memory storage devices which are not readily removable by users (e.g., memory 1004).

The configured medium 1020 may be configured with instructions (e.g., binary instructions) that are executable by a processor 1006; "executable" is used in a broad sense herein to include machine code, interpretable code, byte-code, compiled code, and/or any other code that is configured to run on a machine, including a physical machine or a virtualized computing instance (e.g., a virtual machine or a container). The configured medium 1020 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 1010 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 1006 (e.g., one or more CPUs, ALUs, FPUs, and/or GPUs), memory 1004, data storage 1008, and screens/displays, an operating environment 1000 may also include other hardware 1010, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 1018 such as human user input/output devices (screen, keyboard, mouse, tablet, microphone, speaker, motion sensor, etc.) will be present in operable communication with one or more processors 106 and memory.

In some embodiments, the system includes multiple computing devices 1002 connected by network(s) 1016. Networking interface equipment can provide access to network(s) 1016, using components (which may be part of a network interface 1014) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 1002 may operate in a networked or cloud-computing environment using logical connections to one or more remote devices (e.g., using network(s) 1016), such as a remote computer (e.g., another computing device 1002). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 1002 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

The computing device 1002 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 1008 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 1008 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 10, an operating environment 1000 may include at least one computing device 1002, the at least one computing device 1002 including at least one processor 1006, at least one memory 1004, at least one data storage 1008, and/or any other component discussed below, such as with respect to FIG. 10.

Figure 11:
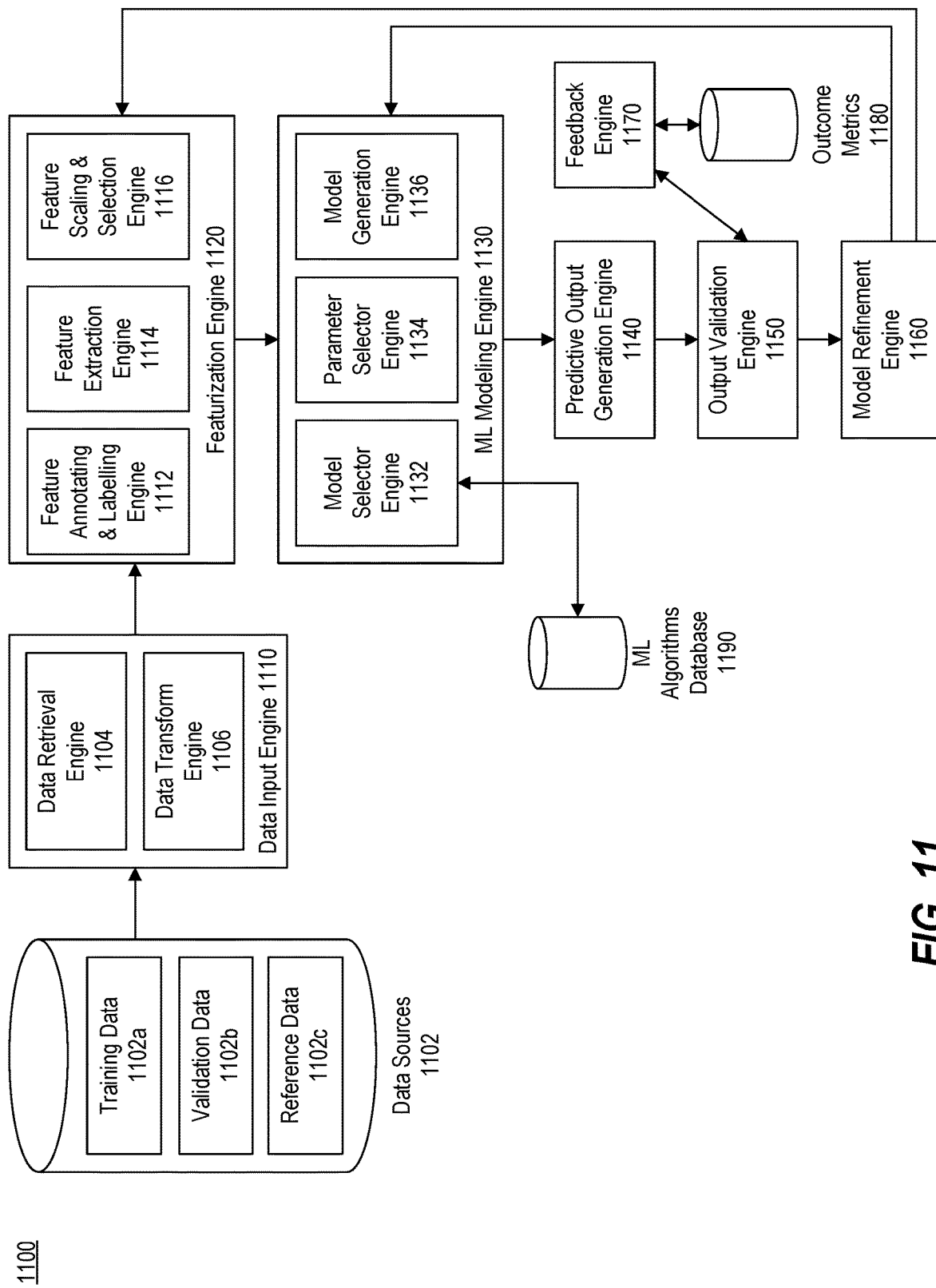
FIG. 11 is a block diagram illustrating an exemplary machine learning platform for implementing various aspects of this disclosure, according to some embodiments of the present disclosure.

FIG. 11 is a block diagram illustrating an exemplary machine learning platform for implementing various aspects of this disclosure, according to some embodiments of the present disclosure.

System 1100 may include data input engine 1110 that can further include data retrieval engine 1104 and data transform engine 1106. Data input engine 1110 may be configured to access, interpret, request, format, re-format, or receive input data from data source(s) 1102. Data source(s) 1102 may include one or more of training data 1102*a* (e.g., input data to feed a machine learning model as part of one or more training processes), validation data 1102*b* (e.g., data against which at least one processor may compare model output with, such as to determine model output quality), and/or reference data 1102*c*. In some embodiments, data input engine 1110 can be implemented using at least one computing device (e.g., computing device 1002). For example, data from data sources 1102 can be obtained through one or more I/O devices and/or network interfaces. Further, the data may be stored (e.g., during execution of one or more operations) in a suitable storage or system memory. Data input engine 1110 may also be configured to interact with data storage 1008, which may be implemented on a computing device that stores data in storage or system memory. System 1100 may include featurization engine 1120. Featurization engine 1120 may include feature annotating & labeling engine 1112 (e.g., configured to annotate or label features from a model or data, which may be extracted by feature extraction engine 1114), feature extraction engine 1114 (e.g., configured to extract one or more features from a model or data), and/or feature scaling and selection engine 1116. System 1100 may also include machine learning (ML) modeling engine 1130, which may be configured to execute one or more operations on a machine learning model (e.g., model training, model re-configuration, model validation, model testing), such as those described in the processes described herein. For example ML modeling engine 1130 may execute an operation to train a machine learning model, such as adding, removing, or modifying a model parameter. Training of a machine learning model may be supervised, semi-supervised, or unsupervised. Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. ML modeling engine 1130 may include model selector engine 1132 (e.g., configured to select a model from among a plurality of models, such as based on input data), parameter selector engine 1134 (e.g., configured to add, remove, and/or change one or more parameters of a model), and/or model generation engine 1136 (e.g., configured to generate one or more machine learning models, such as according to model input data, model output data, comparison data, and/or validation data). Similar to data input engine 1110, featurization engine 1120 can be implemented on a computing device. In some embodiments, model selector engine 1132 may be configured to receive input and/or transmit output to ML algorithms database 1190 (e.g., a data storage 1008). Similarly, featurization engine 1120 can utilize storage or system memory for storing data and can utilize one or more I/O devices or network interfaces for transmitting or receiving data. ML algorithms database 1190 (or other data storage 1008) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model, a linear regression model, a k-means clustering model, a Q-Learning model, a Temporal Difference (TD) model, a Deep Adversarial Network model, or any other type of model described further herein.

System 1100 can further include predictive output generation engine 1140, output validation engine 1150 (e.g., configured to apply validation data to machine learning model output), feedback engine 1170 (e.g., configured to apply feedback from a user and/or machine to a model), and model refinement engine 1160 (e.g., configured to update or re-configure a model). In some embodiments, feedback engine 1170 may receive input and/or transmit output to outcome metrics database 1180. In some embodiments, model refinement engine 1160 may receive output from predictive output generation engine 1140 or output validation engine 1150. In some embodiments, model refinement engine 1160 may transmit the received output to featurization engine 1120 or ML modelling engine 1130 in one or more iterative cycles.

Any or each engine of system 1100 may be a module (e.g., a program module), which may be a packaged functional hardware unit designed for use with other components or a part of a program that performs a particular function (e.g., of related functions). Any or each of these modules may be implemented using a computing device. In some embodiments, the functionality of system 1100 may be split across multiple computing devices to allow for distributed processing of the data, which may improve output speed and reduce computational load on individual devices. In these or other embodiments, the different components may communicate over one or more I/O devices and/or network interfaces.

System 1100 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system comprising:
   at least one memory storing instructions;
   at least one processor configured to execute the instructions to perform operations for automatically generating and editing text, the operations comprising:
      receiving an input text prompt, the input text prompt comprising a null set;
      receiving one or more user instructions;
      determining a set of model parameters based on the one or more user instructions;
      accessing a language model using the at least one processor based on the input text prompt, the set of model parameters, and the one or more user instructions;
      generating, using the accessed language model, an output text based on the input text prompt, the one or more user instructions, and at least one of a sampling temperature parameter or a nucleus sampling parameter;
      receiving one or more new user instructions;
      editing the output text based on the language model and the one or more new user instructions by replacing at least a portion of the output text; and
      optimizing the accessed language model by aligning the language model based on the output text using machine learning;
   wherein:
      the language model is optimized through one or more iterative cycles of training based on one or more outcome metrics associated with the output text and one or more datasets; and
      the one or more datasets comprise at least one of annotated data, labeled data, enriched data, or demonstration data based on one or more output text.

2. The system of claim 1, wherein the input text prompt comprises text or computer code.

3. The system of claim 1, wherein:
   the one or more user instructions comprise user-specified natural language instructions; and
   the operations further comprise determining one or more model parameters, based on the user-specified natural language instructions, that constrain the editing of the input output text.

4. The system of claim 3, wherein the one or more model parameters comprise at least one of a tone, structure, or format associated with the input text.

5. The system of claim 3, wherein the one or more model parameters comprise at least one property associated with an author of the input text.

6. The system of claim 1, wherein:
the language model is configured to determine at least one context parameter based on the input text; and
editing the output text is based on the language model and the at least context parameter.

7. The system of claim 1, wherein:
the nucleus sampling parameter is a decimal value that influences tokens considered by the language model; and
the output text comprises a training dataset for optimization.

8. The system of claim 1, wherein aligning the language model based on the output text using machine learning comprises using reinforcement machine learning.

9. The system of claim 1, wherein editing the output text is based on the output of at least one context parameter through at least one iteration of editing.

10. A method for automatically generating and editing text, comprising:
receiving an input text prompt, the input text prompt comprising a null set;
receiving one or more user instructions;
determining a set of model parameters based on the one or more user instructions;
accessing the language model using the at least one processor based on the input text, the set of model parameters, and the one or more user instructions;
generating, using the accessed language model, an output text based on the input text, the one or more user instructions, and at least one of a sampling temperature parameter or a nucleus sampling parameter;
receiving one or more new user instructions;
editing the output text based on the language model and the one or more new user instructions by replacing at least a portion of the output text; and
optimizing the accessed language model by aligning the language model based on the output text using machine learning;
wherein:
the language model is optimized through one or more iterative cycles of training based on one or more outcome metrics associated with the output text and one or more datasets; and
the one or more datasets comprise at least one of annotated data, labeled data, enriched data, or demonstration data based on one or more output text.

11. The method of claim 10, wherein the input text comprises text or computer code.

12. The method of claim 10, wherein:
the one or more user instructions comprise user-specified natural language instructions; and
the operations further comprise determining one or more model parameters, based on the user-specified natural language instructions, that constrain the editing of the input text.

13. The method of claim 12, wherein the one or more model parameters comprise at least one of a tone, structure, or format associated with the input text.

14. The method of claim 12, wherein the one or more model parameters comprise at least one property associated with an author of the input text.

15. The method of claim 10, wherein:
the language model is configured to determine at least one context parameter based on the input text; and
editing the output text is based on the language model and the at least context parameter.

16. The system of claim 10, wherein:
the nucleus sampling parameter is a decimal value that influences tokens considered by the language model; and
the output text comprises a training dataset for optimization.

* * * * *